Aug. 2, 1938.  J. G. CURRY  2,125,550
TORTILLA MACHINE
Filed March 1, 1937  2 Sheets-Sheet 1
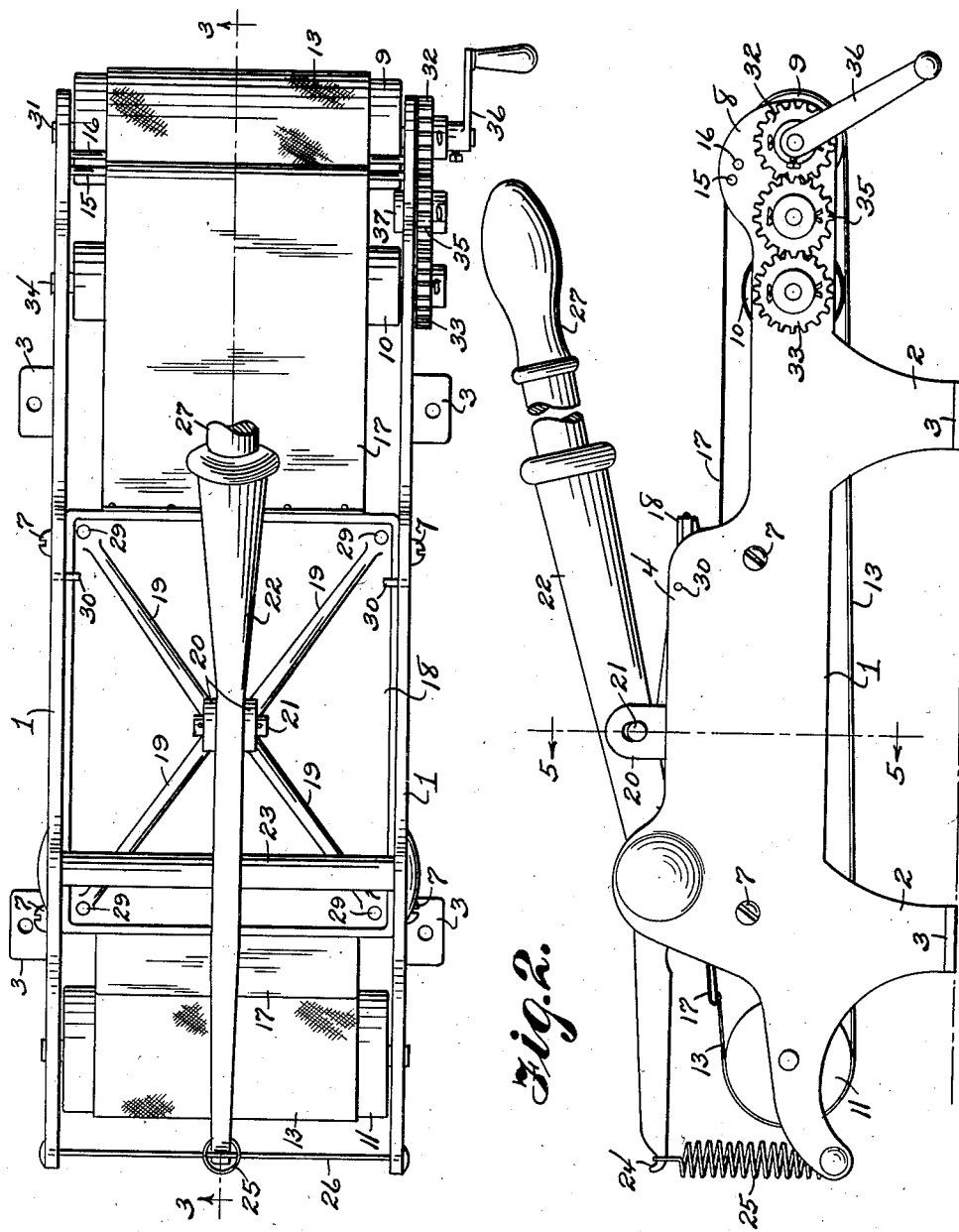
Joseph G. Curry
INVENTOR
BY Victor J. Evans & Co.
ATTORNEYS Aug. 2, 1938. J. G. CURRY 2,125,550
TORTILLA MACHINE.
Filed March 1, 1937 2 Sheets-Sheet 2
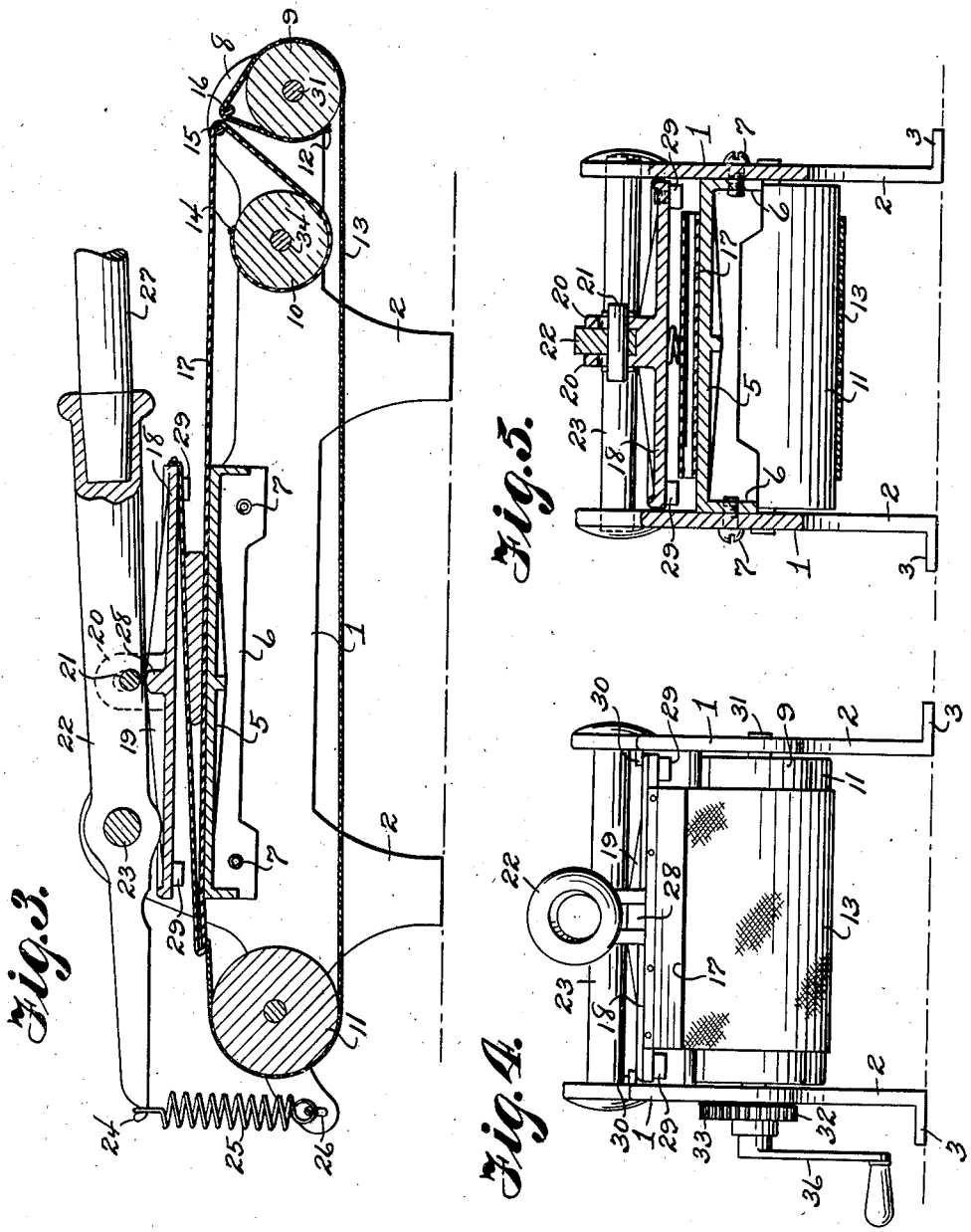
Joseph G. Curry
INVENTOR
BY Victor J. Evans & Co.
ATTORNEYS Patented Aug. 2, 1938

2,125,550

UNITED STATES PATENT OFFICE 2,125,550

TORTILLA MACHINE

Joseph G. Curry, San Antonio, Tex.

Application March 1, 1937, Serial No. 128,540

4 Claims. (Cl. 107—15)

This invention relates to tortilla cake forming machines, and its general object is to provide a machine that is primarily designed for the purpose of preparing or forming disk like cakes from dough made from ground maize or corn, in minimum time, and with very little effort on the part of the user, in that a small quantity of dough is placed in the machine which is then put into operation to form a cake, and the latter is discharged from the machine, ready to be baked into a food product commonly known as a tortilla.

A further object of the invention is to provide a machine for forming tortilla cakes of any thickness and size, in a clean, sanitary and expeditious manner, in that the dough and formed cakes need not be touched by the hands of the user, and the machine can be easily retained in a sanitary condition, as ready access can be had to all the parts for cleaning the same.

Another object is to provide a tortilla cake forming machine, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the machine which forms the subject matter of the present invention.

Figure 2 is a side elevation thereof.

Figure 3 is a sectional view taken approximately on line 3—3 of Figure 1, looking in the direction of the arrows.

Figure 4 is an end view of the machine, looking toward the front thereof.

Figure 5 is a sectional view taken approximately on line 5—5 of Figure 2, looking in the direction of the arrows.

Referring to the drawings in detail, it will be noted that my machine includes a body frame that is made up of a pair of like shaped elongated side members 1 having supporting legs 2 depending therefrom, and the legs have their lower ends bent outwardly at right angles to provide feet 3 having openings therein to receive suitable securing means, for fixing the machine to suitable supporting means.

The side members are enlarged as at 4 and secured between the side members at the enlarged portions thereof is a flat top pressing table 5 having reinforcing ribs formed on the under surface thereof, and flanges depending from the outer edges. The side flanges which are indicated by the reference numeral 6 receive suitable securing means such as screw bolts 7, for securing the table to the side members, as well as to hold the latter fixed with respect to each other.

The forward ends of the side members are enlarged as at 8, and journaled in the extreme forward ends thereof is a roller 9, while a like roller 10 is journaled in the side members, inwardly of the roller 9, as will be noted upon inspection of Figure 3. There is also a roller 11 that is journaled between the side members at the opposite end of the frame, and secured longitudinally to the roller 9 as at 12, is a belt which includes a portion or length 13 formed from canvas or the like. Bridging the enlarged portions 8 of the side members, is a pair of rods 15 and 16, and the rod 15 is disposed above the rod 16, but in close proximity thereto.

The length 13 of the belt, from its point of connection with the roller 9 is disposed over the rod 16, thence about the outer side of the roller 9 and then extends rearwardly for disposal about the roller 11, as clearly shown in Figure 3.

The other portion or length of the belt is indicated by the reference numeral 17 and is formed from elastic material such as rubberized sheeting. The length 17 is folded upon itself to provide superimposed portions, and the looped end is secured to the free end of the length 13 by stitching or other suitable means, while the outer end of the upper superimposed portion is secured to the forward end of the presser plate 18, and the lower portion is disposed to contact the table thence is directed about the rod 15 and from the rod is disposed about the roller 10 to which it is secured as at 14. By that construction, it will be obvious that the superimposed portions cooperate to provide what may be termed a pocket, as best shown in Figure 3 to receive the dough which is pressed between the superimposed portions into cakes, in a manner which will be later described. The presser plate overlies the pressing table and is preferably provided with ribs 19 radiating from the center and disposed about the outer edge of the upper surface thereof, to reinforce the same, and secured to and rising from the presser plate is a U-bracket 20 having vertical slots therein to receive a pin or other suitable pivot means 21 for a lever 22 that is mounted between the arms of the U-bracket 20, as best shown in Figures 1 and 5. The lever has extending therethrough, a shaft 23 which has its ends mounted in bearing openings in the upper ends of the enlarged portions 4 of the side members for rocking movement, and the bearing openings are preferably provided with caps for closing the same, that are formed integral with the side members. The lever extends rearwardly from its point of connection with the shaft 23 and terminates at its rear end into a hook 24 to receive the upper end of a coil spring 25 which has its lower end mounted in a central loop in a cross member 26 that bridges the extreme rear end of the side members and is secured in capped openings therein, as best shown in Figures 1 and 2. It will be seen that the coil spring acts to lift the presser plate 18 and the forward end of the lever is provided with a socket to frictionally receive a handle 27, to facilitate the movement of the presser plate as will be apparent.

Downward movement of the presser plate is direct through the lever 22 in that the plate is provided with an abutment lug 28 rising therefrom for engagement by the lever as clearly shown in Figure 3, and the presser plate is limited in its downward movement by stops 29 having threaded shanks secured in the corners of the plate, as best shown in Figure 5. By that construction, it will be obvious that the heads of the stops are engageable with the table, to provide a suitable space between the latter and the presser plate, so that the cakes will be of uniform thickness, and the thickness can be changed by inserting washers between the heads of the stops and the plate. The presser plate is limited in its upward movement by pins 30 that extend inwardly from the side members for disposal in the path of the plate, as best shown in Figure 1.

Each roller has a shaft extending through the axis thereof, and the ends of the shafts are journaled in the side members. Secured to the shaft 31 of the roller 9 is a gear 32 and a gear 33 is secured to the shaft 34 of the roller 10, and meshing with the gears 32 and 33 is an idle or transfer gear 35 so that motion will be transmitted from the gear 32 to the gear 33. The gear 35 is journaled to a stub shaft 37 fixed to the side member as shown, and all the gears are shown as being secured to their shafts, by cotter pins, but of course any other suitable means may be employed for that purpose. Secured to the shaft 31 by a set screw is a crank handle 36 which is used for operating the machine in the form as shown, but it will be obvious that suitable motive power means may be used for that purpose.

In the use of my machine, a small quantity of dough is placed upon the lower and outwardly extending portion of the length 17 of the belt, which may be marked to indicate the exact place to deposit the dough. The crank handle is then rotated in an anti-clockwise direction for disposing the deposited quantity of dough within the pocket between the superimposed portions, and as the superimposed portions are disposed between the pressing table and the presser plate, movement of the handle in a downward direction against the action of the spring 25 will press the dough into a disk like cake. After the cake is formed, the pressure is relieved, and then the crank handle is rotated in an opposite or clockwise direction for winding the belt about the roller 10, which will cause the length 17 to travel toward the front of the machine. When the cake reaches the rod 15, it will be discharged from the belt, due to the fact that the belt is moved downwardly between the rods 15 and 16 as will be apparent upon inspection of Figure 3, therefore it will be seen that the cake can be formed and discharged from the machine in minimum time, and thence is subsequently baked into the food product known as a tortilla.

While my machine is primarily designed for making tortilla cakes, it will be obvious that it can be used with any kind of dough for making any kind of cakes of the flat disk like type.

It is thought from the foregoing description that the advantages and novel features of the invention will be readily apparent and it is to be understood that the parts of my machine can be made of any material suitable for the purpose, and that changes may be made in the construction, and in the combination and arrangement of the several parts, provided that such changes fall within the scope of the appended claims.

What I claim is:

1. A cake forming machine comprising a trough like frame, supporting legs for the frame, a pressing table bridging the frame, a presser plate cooperating with the table, a shaft rockably mounted in the frame, a handled lever fixed intermediate its ends to the shaft and having a hooked end, U-shaped means formed on and rising from the presser plate and having slots in the arms thereof, means securing the lever to and between the arms and mounted in the slots for slidable movement, a cross member bridging the frame, a coil spring secured to said cross member and the hooked end of the lever respectively for holding the presser plate elevated above the table, lever abutment means formed on and rising from the presser plate between the arms, to provide direct pressure between the lever and the plate, conveying means including means looped upon itself to provide superimposed portions forming a pocket to receive dough therein, handled gear means for moving the conveying means for disposing the superimposed portions between the table and plate to form a cake from the dough upon downward movement of the lever and for conveying the cake therefrom, and means for discharging the cake from the belt.

2. A cake forming machine comprising a supporting frame, a pressing table secured to and bridging the frame, a presser plate cooperating with the table, a spring influenced and manually operated handled lever loosely connected to and supporting the presser plate for actuating the latter toward and away from the table, rollers journaled in the frame, a belt having its ends secured to certain of said rollers and trained about each of the rollers, handled gear means for said certain rollers to cause the belt to travel back and forth longitudinally of the frame, a rubberized length of material included in the belt and secured to the presser plate, said rubberized length being looped upon itself to provide superimposed portions forming a dough receiving pocket, arranged for movement into and out of between the presser plate and table to form a cake from the dough upon downward movement of the lever, and guide means for the belt and for discharging the cake therefrom.

3. A cake forming machine comprising a supporting frame, a pressing table secured to and bridging the frame, a presser plate cooperating with the table, a spring influenced and manually operated lever pivoted to the frame and carrying and engageable with the presser plate, for actuating the latter toward and away from the table, rollers journaled in the frame, a belt trained about the rollers, a rubberized length of material included in the belt and looped upon itself to provide superimposed portions forming a dough receiving pocket, the looped end of said rubberized length being secured to the other length of the belt and the outer end of the upper superimposed portion being fixed to the presser plate, means for rotating the rollers for causing the belt to travel back and forth longitudinally of the frame to carry the superimposed portions into and out of between the presser plate and table in forming a cake from the dough upon downward movement of the lever, and spaced means disposed one above the other and bridging the frame for the passage of the belt between the same for guiding said belt and for discharging the cake therefrom.

4. A tortilla cake forming machine comprising a supporting frame, a flanged pressing table secured to and bridging the frame, a presser plate cooperating with the table, a handled lever connected to and loosely supporting the presser plate over the table and rockably secured to the frame, spring means connected to the frame and lever respectively for urging the presser plate away from the table, lever abutment means on the plate to provide direct pressure between the lever and the plate, a pair of rollers journaled at one end of the frame in parallelism with each other, an idle roller journaled at the opposite end thereof, a belt having its ends fixed to the first mentioned rollers and trained about the idle roller for travel back and forth longitudinally of the frame, a rubberized length of material included in the belt and looped upon itself to provide superimposed portions forming a dough receiving pocket for movement into and out of between the plate and table in forming a cake from dough carried thereby upon downward movement of the lever, spaced rods disposed one above the other and bridging the frame for the passage of the belt between the same for guiding said belt and for discharging the cake therefrom, gear means for rotating the first mentioned rollers and means for actuating the gear means.

JOSEPH G. CURRY.